(No Model.)
G. T. BROWN.
COMBINED ENVELOPE OPENER AND PAPER KNIFE.
No. 330,557. Patented Nov. 17, 1885.
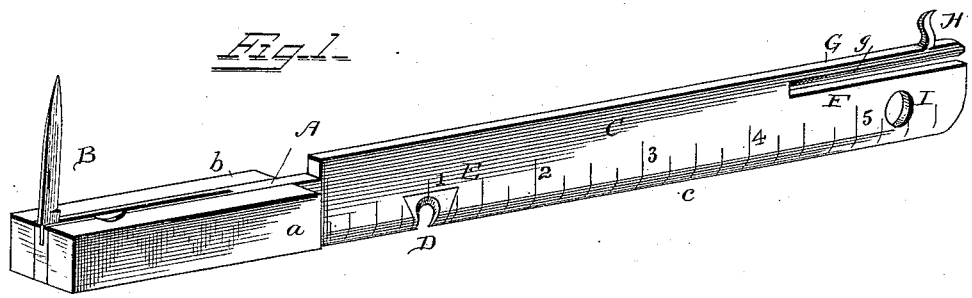
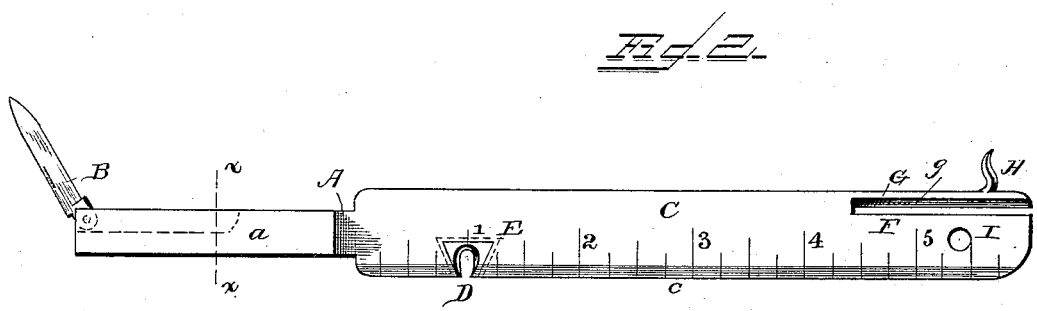
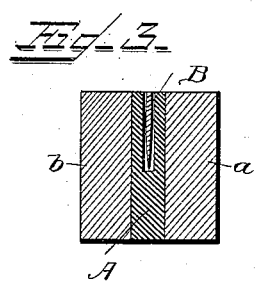
WITNESSES
F. L. Durand
Edward Stanton
George T. Brown,
INVENTOR,
By Louis Bagger & Co.
Attorneys.

UNITED STATES PATENT OFFICE.

GEORGE T. BROWN, OF BELTON, SOUTH CAROLINA.

COMBINED ENVELOPE-OPENER AND PAPER-KNIFE.

SPECIFICATION forming part of Letters Patent No. 330,557, dated November 17, 1885.

Application filed October 12, 1885. Serial No. 179,591. (No model.)

*To all whom it may concern:*

Be it known that I, GEORGE T. BROWN, a citizen of the United States, and a resident of Belton, in the county of Anderson and State of South Carolina, have invented certain new and useful Improvements in Paper-Knives; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved paper-knife. Fig. 2 is a side view of the same; and Fig. 3 is a cross-section through the handle, on the line $x\ x$, the blade being shown closed.

Similar letters of reference indicate corresponding parts in all the figures.

My invention has relation to paper-knives; and it consists in the improved utensil for cutting envelopes, twine, &c., which will be hereinafter more fully described and claimed.

In the accompanying drawings, A denotes the handle, which may be of any suitable material, and is provided on one side with a suitable ink-eraser, $a$, and on the opposite side with a suitable rubber or pencil eraser, $b$. The handle is slotted to make room for the folding knife-blade B. The blade of the paper-knife proper (shown at C) may be made of ivory, bone, metal, wood, or any other suitable material, and has a cutting-edge, $c$, which may be marked off by an inch scale, as shown on the drawings. In this blade, near the handle, is made a notch, D, the edges of which should be sufficiently sharp to form a twine-cutter. Where the blade proper is made of wood or bone, or some similar substance which does not admit of sharpening, I construct the twine-cutter by inserting a small disk or plate of metal into a dovetailed recess formed in that portion of the blade, as shown at E, the dovetailed shape of the metal plate and of the recess into which it is inserted preventing it from slipping out. Where, however, the entire blade is made of metal, the twine-cutter is formed simply by forming a notch in the edge of the blade and sharpening the same. At one end of the blade is formed an elongated slot, F, parallel to the sides of the blade, so as to form a projection, G, provided with a sharp edge, $g$, adapted for the insertion into the flap of a sealed envelope, so as to readily cut it open. Upon the back part of this projecting envelope-opener is an S-shaped finger, H, the sharp point of which serves for the cutting open of newspaper-wrappers, &c., by ripping the wrapper open, either by pulling or pushing the knife, according to which one of the two bends in the S-shaped ripper is used. I also provide the blade with a hole or aperture, (shown at I,) by means of which it may be suspended from a nail when not in use.

From the foregoing description, taken in connection with the drawings, the manner of using this implement in its various capacities will readily be understood without further explanation. It can be manufactured at small expense, and will be found a great convenience upon the writing-desk.

Having thus described my invention, I claim and desire to secure by Letters Patent of the United States—

The herein-described implement or utensil, consisting of the paper-knife C, having a suitable handle, and constructed with the envelope-opener G, having an S-shaped wrapper-ripper or projection at its free end, with sharpened edges, substantially as and for the purpose set forth.

In testimony that I claim the foregoing as my own I have hereunto affixed my signature in presence of two witnesses.

GEORGE T. BROWN.

Witnesses:
G. W. FANT,
JAS. W. ERSKIN.